M. & F. SEWARD.
Mode of Manufacturing a Combined Horseshoe-Calk and Nail.
No. 147,799. Patented Feb. 24, 1874.
fig. 1.
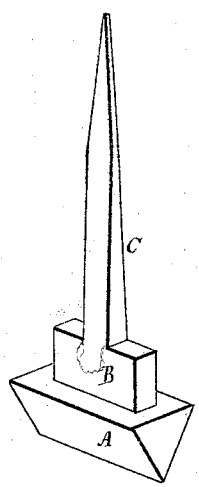
fig. 2.
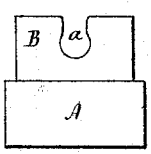
fig. 3. fig. 4.
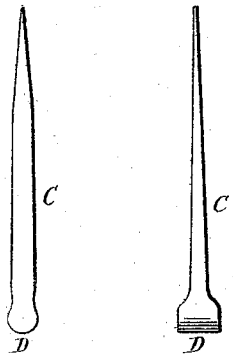

UNITED STATES PATENT OFFICE.

MOSES SEWARD AND FRANK SEWARD, OF NEW HAVEN, CONNECTICUT.

IMPROVEMENT IN THE MODES OF MANUFACTURING A COMBINED HORSESHOE CALK AND NAIL.

Specification forming part of Letters Patent No. 147,799, dated February 24, 1874; application filed January 21, 1874.

*To all whom it may concern:*

Be it known that we, MOSES SEWARD and FRANK SEWARD, of New Haven, in the county of New Haven and State of Connecticut, have invented a new Improvement in the Mode of Manufacturing a Combined Horseshoe Calk and Nail; and we do hereby declare the following, when taken in connection with the accompanying drawings and the letters of reference marked thereon, to be a full, clear, and exact description of the same, and which said drawings constitute part of this specification, and represent, in—

Figure 1, a perspective view of the calk complete; Fig. 2, the calk as prepared to receive the nail; and, in Figs. 3 and 4, the nail as prepared for attachment to the calk.

This invention relates to an improvement in that class of toe-calks for horseshoes in which the calk is formed with a nail, and secured to the shoe by the said nail extending through the shoe and driven into the hoof.

The toe-calks have usually been forged complete in one piece, which necessitates considerable labor in drawing down the stock to form the nail.

The object of this invention is to avoid this drawing down; and it consists in forming the nail and calk in separate pieces, but secured together by forming the shank of the calk with a recess, and the nail with a corresponding head, which sets into the said recess, and struck down firmly unites the two parts.

A is the calk, formed with the usual shank B. In this shank we make a recess, *a*, as seen in Fig. 2, and form the nail C with a corresponding head, D, longer transversely than the thickness of the shank B, as seen in Fig. 4. This head is set into the recess *a* of the calk and struck down, the head upon the shank, either hot or cold, so as to firmly unite the two and complete the calk, as seen in Fig. 1.

This enables us to use machine-made nails, and thus avoid entirely the usual drawing down of the nail, and, hence, to produce the calks at a reduced cost.

We claim as our invention—

The mode of manufacturing a combined horseshoe calk and nail herein described, consisting in forming the shank of the calk with a recess, *a*, and the nail with a corresponding head, set in said recess and struck down, substantially as described.

MOSES SEWARD.
FRANK SEWARD.

Witnesses:
J. H. SHUMWAY,
A. J. TIBBITS.